United States Patent [19]
Harris

[11] 4,139,171
[45] Feb. 13, 1979

[54] ARTICULATED WING ORNITHOPTER

[76] Inventor: Jeremy M. Harris, 479 Park Overlook, Worthington, Ohio 43085

[21] Appl. No.: 826,942

[22] Filed: Aug. 19, 1977

Related U.S. Application Data

[63] Continuation-in-part of Ser. No. 705,813, Jul. 16, 1976, abandoned.

[51] Int. Cl.² .............................................. B64C 33/00
[52] U.S. Cl. ...................................................... 244/22
[58] Field of Search .................... 244/11, 22, 90 R, 38, 244/37; 115/31

[56] References Cited

U.S. PATENT DOCUMENTS

| | | | |
|---|---|---|---|
| 1,622,629 | 3/1927 | Ehrlich | 244/22 |
| 1,835,630 | 12/1931 | Bawlus | 244/22 |
| 2,820,601 | 1/1958 | Crawford | 244/90 R |
| 3,307,358 | 3/1967 | Kerandraon | 115/31 X |

FOREIGN PATENT DOCUMENTS

| | | | |
|---|---|---|---|
| 596295 | 4/1960 | Canada | 244/22 |
| 348946 | 5/1931 | United Kingdom | 244/11 |

Primary Examiner—Galen L. Barefoot
Attorney, Agent, or Firm—Mason, Fenwick & Lawrence

[57] ABSTRACT

An ornithopter which produces a large swept volume of the wings and essentially constant lift and includes a first and a second outer wing segment joined by an aerodynamically significant center wing segment having pivotal connections at the ends to the first and second outer wing segments, a driving mechanism for translating the center wing segment vertically with respect to the body of the ornithopter and links pivotally connected to the outer wing segments and to the body to cause the outer wing segments to rotate relative to the center wing segment as the center wing segment translates.

7 Claims, 7 Drawing Figures

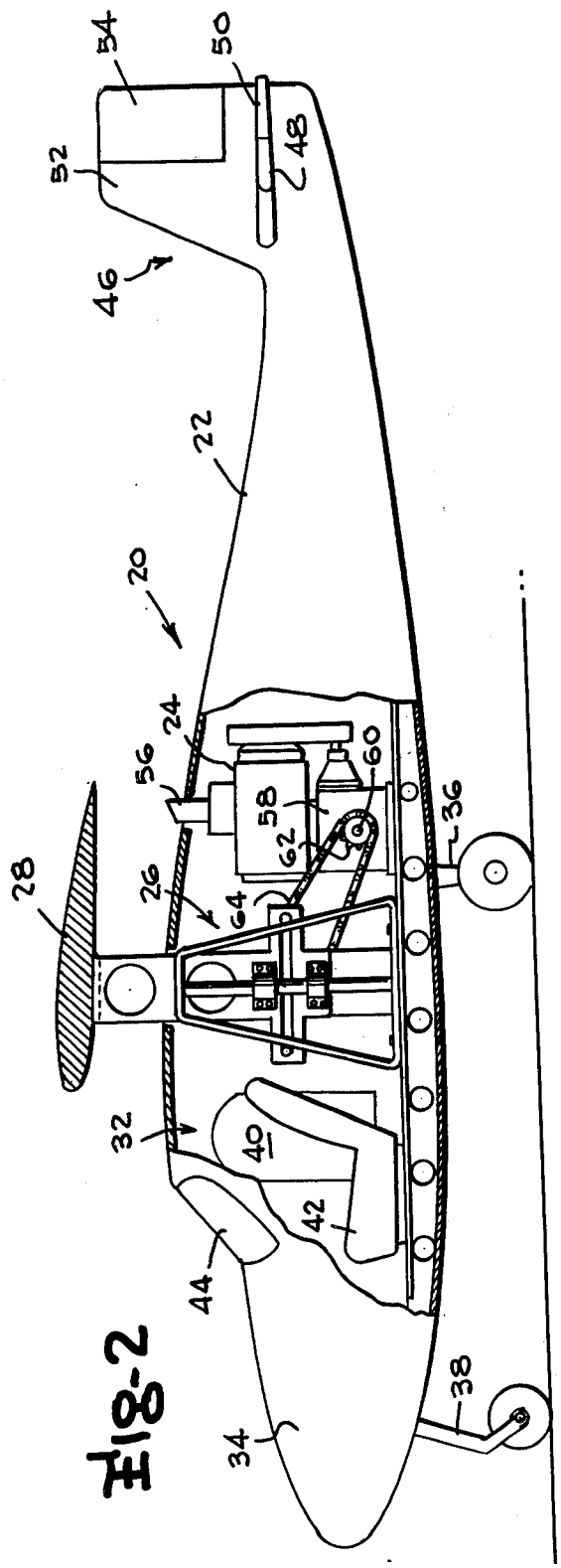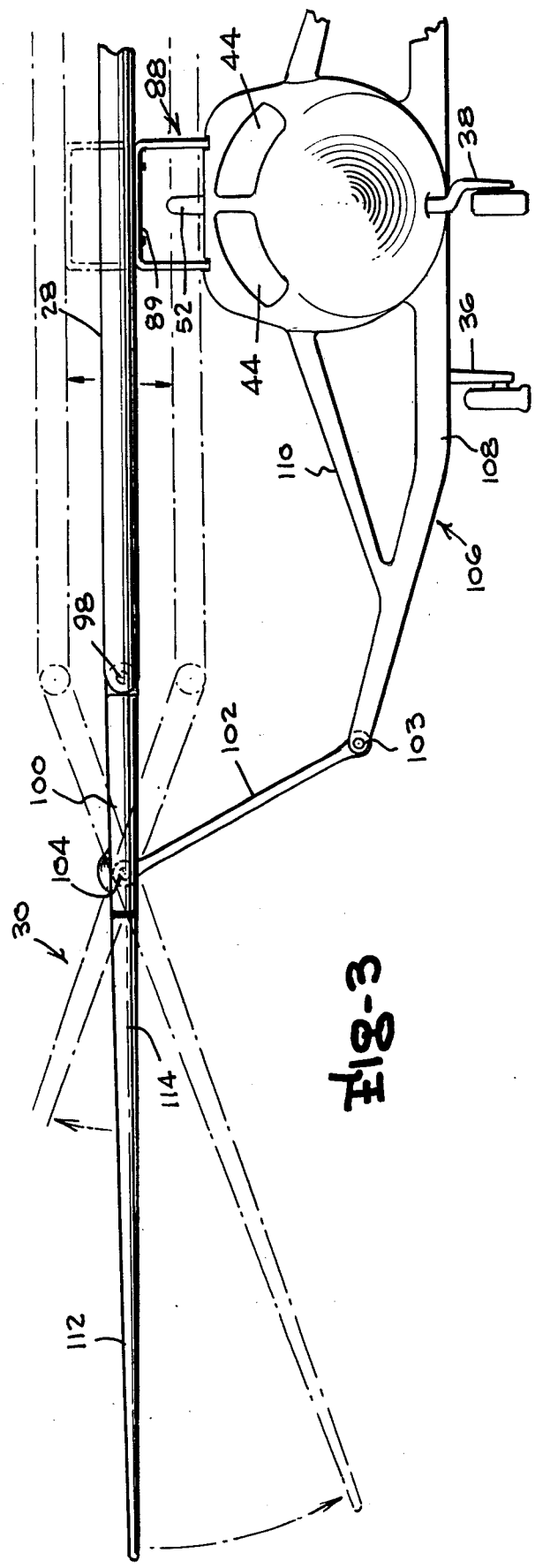

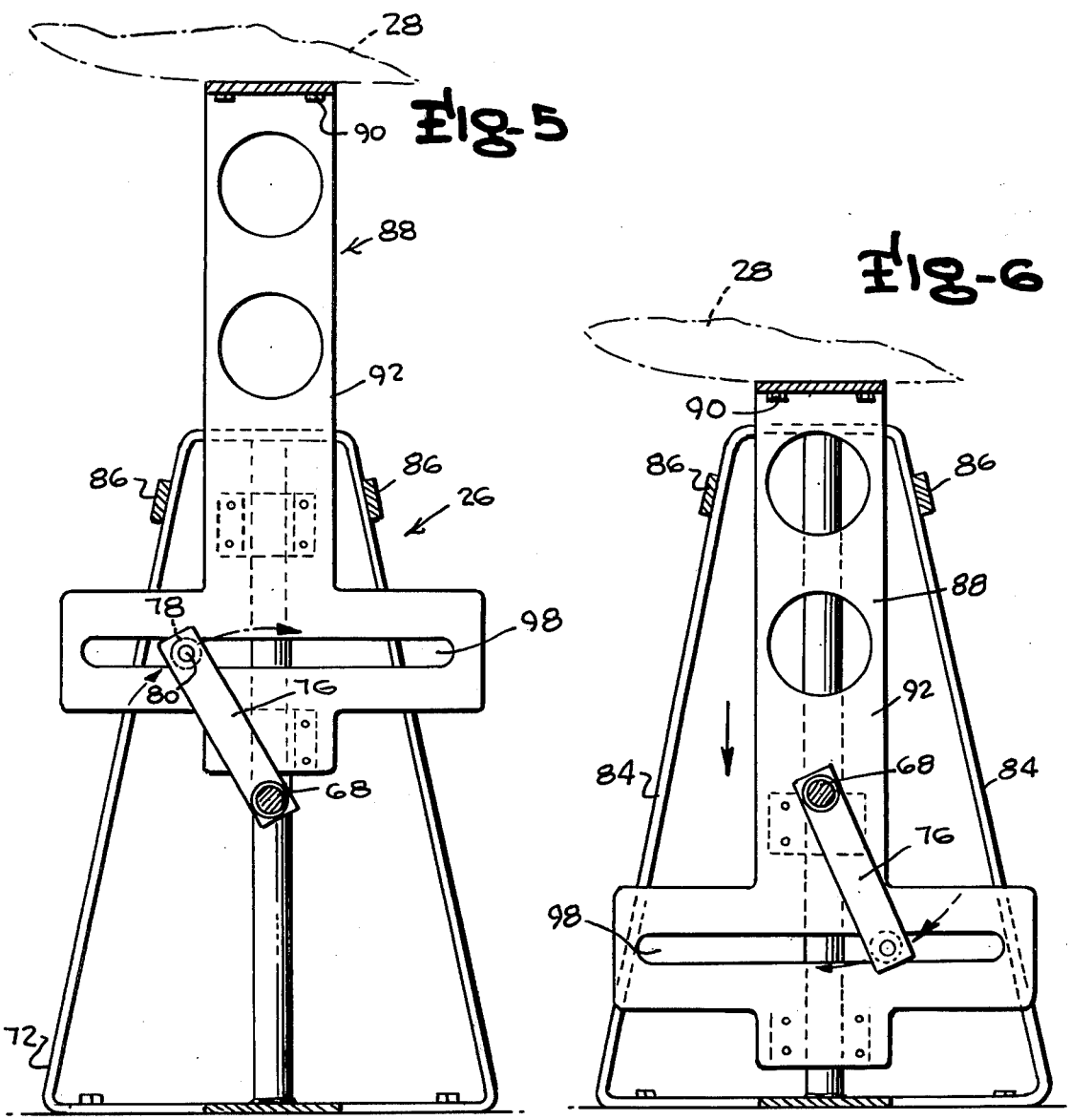
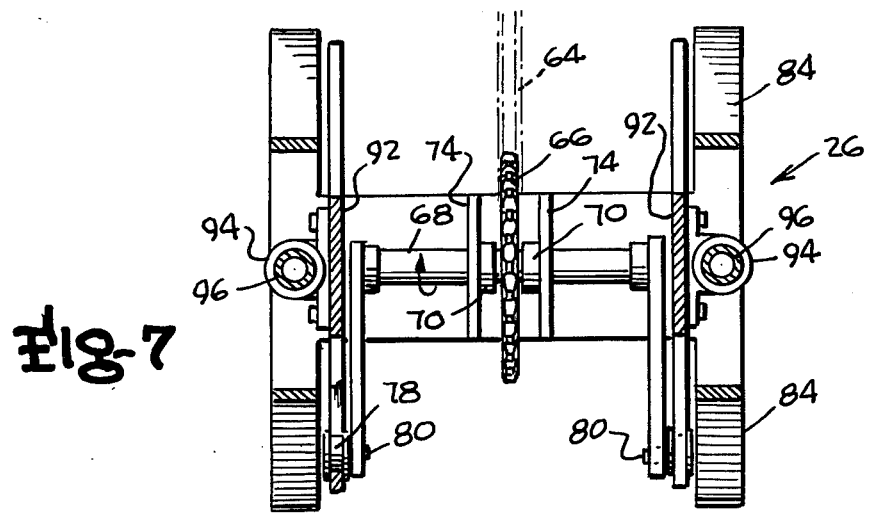

ARTICULATED WING ORNITHOPTER

This is a continuation-in-part of application Ser. No. 705,813 filed July 16, 1976, now abandoned.

This invention relates to flying crafts and more particularly to an ornithopter having wings which rotate and translate relative to the body of the ornithopter.

The prior art comprises numerous ornithopter configurations extending as far back as Leonardo da Vinci's time. The precursor of ornithopters appeared in Greek mythology when Icarus escaped imprisonment but fell into the sea because the wax of his wings melted as he flew too near the sun. There has been a continuing effort over the centuries by many people to create machines capable of simulating the stroking wings of birds because their flight seems so natural and easily achieved.

Nearly all previously known ornithopters have incorporated non-articulated wings and are not suitable for scaling up to man-carrying size. Many small scale models of flying crafts having wings which rotate relative to the body of the craft have actually been flown. Despite the numerous ornithopters which have been developed, no full-scale ornithopters have been generally recognized as achieving sustained flight. The simple flapping wings of most previous ornithopters cause large overall variations in lift. Such an ornithopter is not practical for carrying human beings because the violent vertical acceleration and deceleration due to lift variation could not be tolerated by the pilot or the passengers.

A few previously known ornithopters have embodied some of the features needed to obtain constant lift; however, these devices have involved separate surfaces or wings such as Von Holst's classical dragonfly configuration having tandem rocking wings or the side-by-side rocking wing arrangement shown in U.S. Pat. No. 1,135,009 to H. D. Gammeter. While these designs offer the potential for constant lift and inherent mass balance, they involve two separate surfaces which create mutual flow interference problems and increased losses due to the presence of four wing tips instead of the minimum of two. Additionally, these previous designs have not favored the achievement of large swept volumes.

An ornithopter having inner wing segments pivoted to the ornithopter body and having outer wing segments pivoted to the inner wing segments could produce constant lift. The difficulty with this configuration is the lack of a large swept volume which is necessary for effective production of thrust. In the region adjacent to the body, the wings have very small flapping amplitudes and therefore small swept volumes.

Accordingly, it is the primary object of this invention to provide a novel flying craft.

Another object of the present invention is to provide an ornithopter in which the overall lift on the ornithopter during flapping of the wings is substantially constant.

A further object of the present invention is to provide a novel ornithopter in which the pitching moments on the body of the ornithopter due to flapping of the wings are substantially cancelled.

A still further object of the present invention is to provide a novel ornithopter having a wing configuration which creates a large swept volume.

Another object of the present invention is to provide an ornithopter having a wing configuration which develops thrust on both the upstroke and the downstroke.

A further object of the present invention is to provide an ornithopter with a wing configuration which lends itself to simple mass balance.

A still further object of the present invention is to provide an ornithopter in which the end effects on the wings and the air flow interferences between wing segments are minimized as compared with other constant lift ornithopter configurations.

Other objects and advantages of the invention will become more apparent to those persons having ordinary skill in the art to which the invention pertains, in the following description taken in conjunction with the accompanying drawings wherein:

FIG. 2 is a side elevation view of the ornithopter shown in FIG. 1, having a portion thereof broken away;

FIG. 3 is a front elevational view showing the wing segments in the various positions assumed during flight of the ornithopter illustrated in FIG. 1;

FIG. 5 is a cross-sectional view taken along line 5—5 of FIG. 4 with the drive mechanism approaching the fully extended upstroke position;

FIG. 6 is a cross-sectional view similar to FIG. 5 with the drive mechanism approaching the fully retracted downstroke position; and FIG. 7 is a cross-sectional view of the drive mechanism taken along line 7—7 in FIG. 4.

Figure 1:
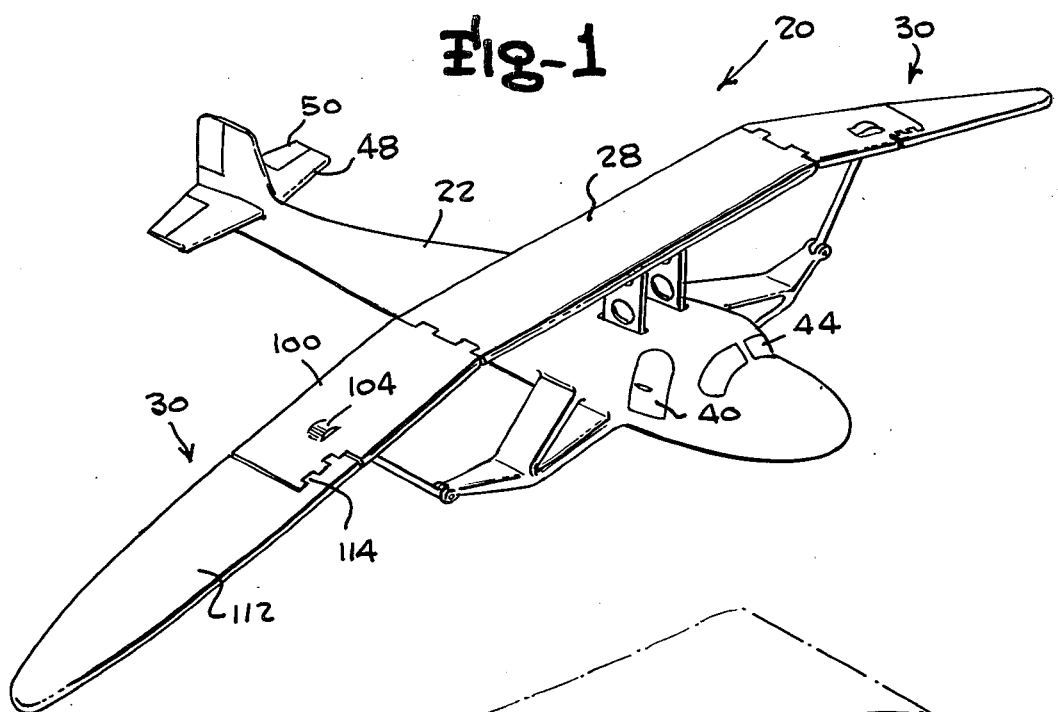
FIG. 1 is a perspective view of an ornithopter embodying the invention.

Referring to the drawings, there is illustrated an ornithopter 20, embodying the invention, which includes a body 22, a propulsion engine 24, a drive mechanism 26, a center wing segment 28 and outer wing segments 30.

The body 22 may be of conventional monocoque construction and includes a cockpit 32 containing the conventional instrumentation and controls. Power for the ornithopter is provided by the propulsion engine 24 which is positioned behind the drive mechanism 26 as shown in FIG. 2. Fuel for the engine is supplied from a fuel tank 34 indicated in the nose of the body in FIG. 2. The landing gear for the ornithopter includes main wheels 36 and a nose wheel 38 which are of conventional construction. Access to the cockpit 32 is provided through an access door 40 in the side of the body with seat 42 positioning the pilot for visibility through windshield 44. The tail section 46 of the body 22 includes conventional horizontal stabilizers 48 with elevators 50 and a vertical stabilizer 52 with rudder 54. These control surfaces may be manipulated by controls in the cockpit 32 in the conventional manner.

Figure 4:
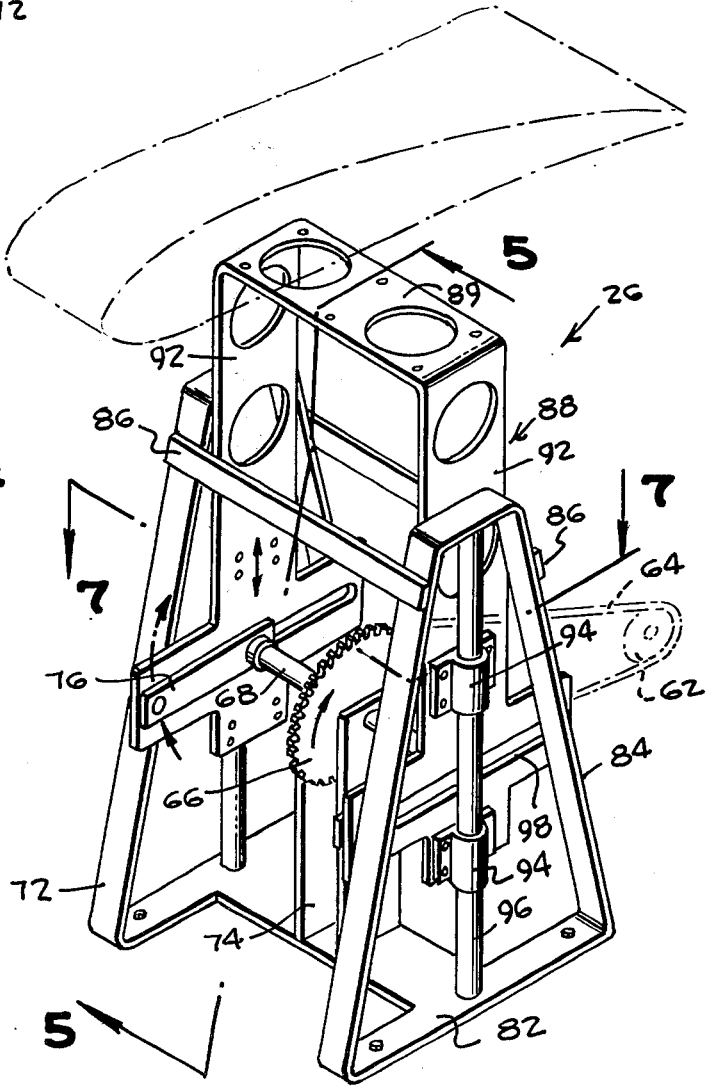
FIG. 4 is a perspective view of the drive mechanism illustrated in FIG. 2.

The propulsion engine 24 is an internal combustion engine having an intake pipe 56 extending through the body 22 to the atmosphere. A drive from the engine provides an input to a gear box 58 to drive an output shaft 60, as shown in FIG. 2, and a drive sprocket 62 splined thereto. A drive chain 64 operatively connects the drive sprocket 62 to a main sprocket 66, shown in FIGS. 4 and 7, centrally mounted on a drive shaft 68. The drive shaft 68 is journaled in bearings 70 attached to a frame 72 of the drive mechanism 26 by upright support brackets 74. Fixed to opposite ends of the drive shaft 68 are twin driving cranks 76 with the free ends of the driving cranks having a roller bearing 78 attached thereto by a stub shaft 80, as shown in FIG. 7.

The drive mechanism frame 72 includes an I-shaped base member 82 with the ends of the base extending upwardly to form trapezoidal shaped end members 84 on opposite ends of the base member 82. The upright support brackets 74 are mounted directly to the base member 82 to provide a rigid support for the drive shaft 68. The end members 84 are connected by reinforcing members 86 which extend between the two end members on opposite sides of the drive mechanism frame to provide sufficient rigidity and strength for the drive mechanism.

A downwardly opening U-shaped drive member 88 has an upper end 89 thereof fixed by bolts 90 to the center wing segment 28, as shown in FIGS. 3, 5 and 6. The drive member 88 includes downwardly extending arms 92 which are parallel and adjacent the end members 84 of the frame 72. A pair of sliding bearings 94 are spaced apart and mounted on each of the arms 92 of the drive member 88 with the bearings slidably mounted on slide rods 96. The upper and lower ends of the slide rods 96 are fixed to the end members 84 to permit translating movement between the drive member 88 and the frame 72. Horizontal slots 98 extend perpendicular to the arms 92 and the slide rods 96, and slidably retain the roller bearings 78 of the driving cranks 76 thereby transmitting reciprocating motion to the drive member 88 as the main sprocket 66 is rotated by the propulsion engine 24. The center wing segment 28 may, therefore, be translated at the desired speed with respect to the body 22 of the ornithopter by controlling the speed of the engine. The drive mechanism 26 is basically a scotch yoke mechanism which translates rotary motion into reciprocating motion.

The center wing segment 28 has a conventional airfoil configuration as shown in FIG. 2 and center wing pivot joints 98 at the outer ends, as shown in FIGS. 1 and 3. The pivot joints 98 connect the center wing segment to inner segments 100 of the outer wing segment 30 to permit the outer wing segments to assume the positions indicated in FIG. 3. Pivoting of the outer wing segments 30 is accomplished by the interaction between the movement of the drive member 88 as it assumes the various positions, indicated in FIG. 3, and the pivot links 102. One end of the pivot link is pivotally connected to the outer wing segment 30 at a link pivot joint 104 disposed outwardly of the center wing pivot joint 98. The second end of the pivot link 102 is pivotally connected by a strut pivot joint 103 to a strut assembly 106 extending outwardly from the body 22 of the ornithopter as shown in FIGS. 1 and 3.

The strut assembly 106 includes a lower member 108 which extends through the body 30 and provides support for the wheels 36 and the strut pivot joints 103. An upper brace member 110 produces a triangular configuration between the lower member 108 and the side of the body 22 to provide sufficient strength to carry the forces applied to pivot link 102. The lower and upper members 108 and 110 are suitably contoured to reduce air resistance during flight.

The outer wing segments 30 include the inner segment 100 and a tip segment 112 with a hinge pin joint 114 between the tip segment 112 and the inner segment 100. The hinge pin joint 114 is damped, spring-centered and passive to permit articulation of the tip segments 112 with respect to the inner segment as the wing assembly assumes the various positions indicated in FIG. 3. There is no requirement for a drive linkage between the inner segment 100 and the tip segment 112 to achieve the desired flight. An ornithopter according to the present invention can fly without this pitching freedom since pitching freedom is not necessarily required for thrust at high advance ratios. The general shapes of each of the wing segments, including the center wing segment, are similar to the shapes of conventional wings.

Additional control surfaces such as ailerons may be added to the center and outer wing segments 28 and 30 to achieve the desired maneuverability of the aircraft. The outer wing segments may be operated by an internal mechanism for rotating the outer wing segments thereby eliminating the pivot links 102.

To achieve the desired large swept volume, the center segment must be sufficiently large relative to the total wing area to be aerodynamically significant and cause the displacement of large volumes of air as the center wing segment is translated vertically.

Any of the wing segments may have pitching freedom such as shown by hinge pin joints 114, however, pitching freedom is not necessarily required or desirable for high speed cruising flight. The provision of pitching freedom is used for avoiding dynamic stall and producing thrust at low speeds. Pitching freedom is necessary for production of static thrust for taxiing and for takeoff. Phasing of pitching action with wing stroking may be achieved with a separate pitch control mechanism which is not shown.

A particularly useful mode of pitching occurs when the outer wing panels pitch approximately 90° out of phase with the main wing movement in the lagging sense. This motion results in rotating the leading edge down on the downstroke and up on the upstroke, with maximum pitching amplitude at midstroke. This 90° phasing can be achieved passively without any driving mechanism if the hinge axis of the pin joints 114 is in the forward portion of the wing chord. A combination elastic and viscous restraint may be provided for controlling the degree of pitching with the restraint being adjustable by the pilot.

For constant lift, the geometric proportions of the wing panels and the effective pivot points of the outer panels are arranged so that the sum of the total positive and negative lift due to flapping over the whole span at any instant is zero, which leaves only a constant lift component to sustain the aircraft. There is a continuum of panel arrangements and pivot points which will produce constant lift. An important function connecting ratios involving center segment length, outer segment length and distance from hinge pin 98 to link pivot joint 104 is roughly hyperbolic in shape, which implies that the ratio of the center section span to the distance between pin 98 and pivot 104 should decrease as the ratio of outer segment length to center segment length is increased. While there is no optimum solution, there are preferred ranges of values which appear to be more practical in view of the need to achieve a large swept volume without excessive swing angles of the outer segments. Specifically, the most useful values occur when the two ratios become equal with each ratio having a value of approximately 2. To meet this condition, the length of the pivoted outer segment would be approximately twice the distance from the wing center line to hinge pin 98 which in turn would be twice the distance from pin 98 to pivot 104.

The swept volume of an ornithopter according to the present invention is large, as can be seen by the displacement of the wing segments in the upstroke, midstroke and downstroke positions shown in FIG. 3. Since a portion of the wing segments are moving up as other portions are moving down, this configuration lends itself to simple mass balancing thereby contributing to smooth flight. With only two wing tips, this configuration minimizes wing tip effect and interference effect as compared with other constant lift ornithopter configurations utilizing multiple independent wings. With the configuration of the present invention, the large undesirable pitching moments caused by displaced drag distribution are substantially cancelled, thereby contributing to steady flight which is highly desirable for the comfort of pilots and passengers.

Takeoff may be accomplished with an ornithopter according to the present invention utilizing wing segments without the pitching freedom provided by the hinge pin joints 114 if the takeoff is performed into a wind of sufficient velocity.

Alternatively, the wheels 36 may be driven by engine 24 through gears, belts, or the like to accelerate the ornithopter to a velocity at which the ornithopter can become airborne through the lift of the wing segments. As previously described, the hinge pin joints 114 may be used to cause pitching of the outer wing segments 30 which will allow the ornithopter to accelerate to a takeoff velocity without any drive being applied to the wheels. With this pitching of the outer wing segments 30, it also becomes unnecessary to takeoff into a wind.

Operation of the ornithopter is accomplished by controlling the speed of the propulsion motor 24 and thereby the rate of oscillation of the center wing segment and corresponding rotation of the outer wing segments to achieve the desired lift and thrust. The plane is maneuvered in the conventional manner through control of the rudder 54 and the elevators 50 to achieve the desired flight path.

The apparatus as described can be modified in numerous ways as discussed above while achieving the desired constant lift through vertical translation of a center wing segment and rotation of outer wing segments about the ends of the center wing segment.

In the foregoing detailed description, it will be evident that there are a number of changes, adaptations and modifications of the present invention which come within the province of those skilled in the art. However, it it intended that all such variations not departing from the spirit of the invention be considered as within the scope thereof and as limited solely by the appended claims.

I claim:

1. An ornithopter comprising a body and a wing, said wing comprising first and second outer wing segments, a center wing segment having a first end pivotally connected to one end of said first outer wing segment and having a second end pivotally connected to one end of said second outer wing segment, the area of said center wing segment being a significant portion of the wing area of said wing, a driving means for translating said center wing segment with respect to said body, and means for rotating said outer wing segments relative to said center wing segment thereby providing an ornithopter with a large swept volume and essentially constant lift.

2. The ornithopter of claim 1 wherein the rotating means comprises a first link pivotally connected at one end to said first outer wing segment and pivotally connected at the other end to said body and a second link pivotally connected at one end to said second outer wing segment and pivotally connected at the other end to said body.

3. The ornithopter of claim 1 wherein each outer wing segment includes a tip segment, an inner segment pivotally connected to said center wing segment and a pitching hinge between said inner segment and said tip segment.

4. The ornithopter of claim 2 additionally including struts extending outwardly from said body and pivotally connected to said first and second link for providing said pivotal connection between said link and said body.

5. The ornithopter of claim 2 wherein each outer wing segment includes a tip segment, an inner segment pivotally connected to said center wing segment and a pitching hinge between said tip segment and said inner segment with said pitching hinge having an axis of rotation generally perpendicular to the axis of rotation of said pivotal connection between said inner segment and said center wing segment.

6. The ornithopter of claim 1 wherein the driving means translates said center wing segment substantially vertically with respect to said body.

7. The ornithopter of claim 6 wherein the driving means comprises a scotch yoke mechanism fixed to the body, and a rotary engine, said mechanism operatively connecting said engine with said center wing segment to translate said center wing segment as said engine rotates.

* * * * *